United States Patent [19]

Eriksson

[11] Patent Number: 4,485,714
[45] Date of Patent: Dec. 4, 1984

[54] ARRANGEMENT FOR ATTACHING A KNIFE BLADE IN A POWER SHEARS

[75] Inventor: Egon Å. L. Eriksson, Skellefteå, Sweden

[73] Assignee: Ursvikens Mekaniska Verkstads Aktiebolag, Ursviken, Sweden

[21] Appl. No.: 315,017

[22] Filed: Oct. 26, 1981

[30] Foreign Application Priority Data

Oct. 28, 1980 [SE] Sweden ................ 8007571

[51] Int. Cl.³ ........................................ B23D 35/00
[52] U.S. Cl. ........................................ 83/698; 83/632; 83/697
[58] Field of Search ............... 83/698, 699, 697, 694, 83/632

[56] References Cited

U.S. PATENT DOCUMENTS

| 3,046,825 | 7/1962 | Thompson | 83/698 |
| 3,340,758 | 9/1967 | Peterson et al. | 83/699 |
| 3,515,023 | 6/1970 | Schiffers | 83/698 |
| 3,916,747 | 11/1975 | Murray | 83/698 |

FOREIGN PATENT DOCUMENTS

| 1752728 | 5/1971 | Fed. Rep. of Germany |  |
| 54113 | 12/1967 | Poland | 83/698 |
| 76133511 | 8/1979 | Sweden |  |
| 1080095 | 8/1967 | United Kingdom | 83/698 |
| 268862 | 9/1970 | U.S.S.R. | 83/698 |

Primary Examiner—Donald R. Schran
Attorney, Agent, or Firm—Robert E. Burns; Emmanuel J. Lobato; Bruce L. Adams

[57] ABSTRACT

An arrangement, preferably for clamping knife blades in power shears includes a longitudinal T-slot or dovetail slot in the blade holder or the blade itself. Gripping means (16, 46, 76) are provided in the slot for engaging retainers (19, 47). The retainers or gripping means are connected to biasing means whereby the blade is pressed against the holder. The biassing means comprise spring means (28) or hydraulic clamping cylinders (36, 38; 61, 62). For relieving the bias of the spring means (28) there are provided hydraulic cylinders (22, 23; 51, 52), which release the blade when they are in operation. Alternatively the bias of the hydraulic clamping cylinders is relieved by counteracting spring means (43; 66) to release engagement of the gripping means.

Since the blade is retained by means of retainers engaging in a groove, it can be withdrawn sideways, which enables rapid exchange. The hydraulic operation for clamping and release of the blade, respectively, is very rapid.

13 Claims, 6 Drawing Figures

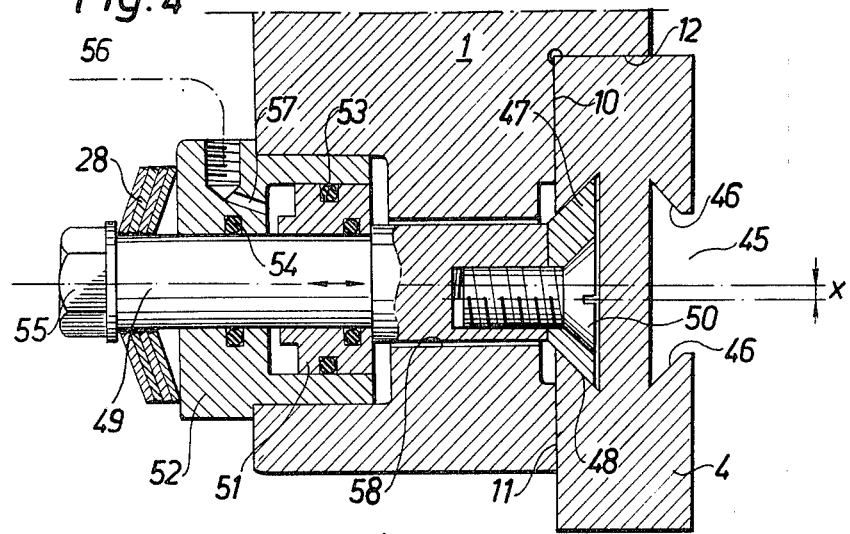
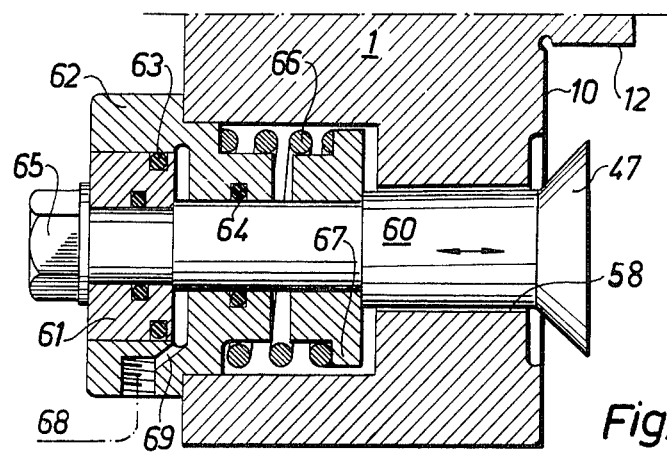
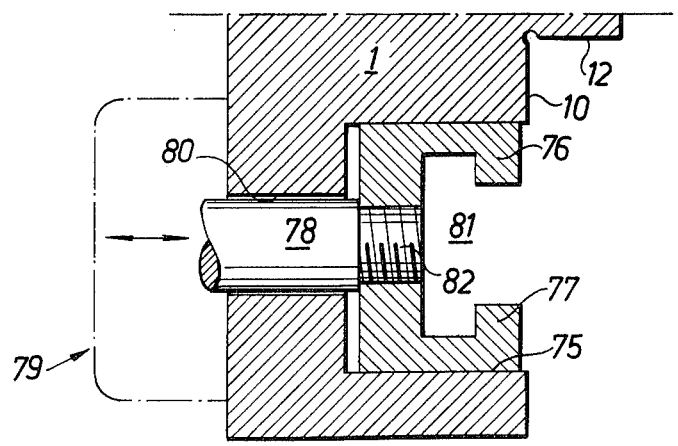

ARRANGEMENT FOR ATTACHING A KNIFE BLADE IN A POWER SHEARS

FIELD OF THE INVENTION

The present invention relates to an arrangement for attaching an elongate prismatic object, such as a knife blade or the like to a holder. The holder has a first and a second support surface at an angle and preferably at right angles to each other, which engage against corresponding support surfaces on the object. Fastening means press one of the support surfaces of the object against the engaging support surface of the holder.

BACKGROUND OF THE INVENTION

Knife blades for power shears are an example of this type of attachment. A power shears is conventionally provided with knife blades of elongate prismatic shape and with a rectangular cross section, there being an upper movable blade and a lower fixed blade. The long sides of the rectangle are normally substantially longer than its short sides, and the blade is placed in its holder with the long side of the rectangle upright. The lower holder is formed by the shears table, and the upper holder by a vertically movable beam incorporated in the shears. The lower short side of the lower blade abuts against a support surface on the table which takes up the vertical shearing force. A wide side of the blade is pressed against a vertical support surface of the table by a plurality of screws distributed along the length of the blade. In a corresponding mode, the upper blade is attached to the beam in the opposite position, an upper short side thus abutting an upward support surface of the beam.

This type of attachment is functionally satisfactory and the structure is simple. However, it is burdened with certain disadvantages which have made themselves more and more apparent in conjunction with the increased production rate of modern power shears.

A modern high-production power shears can have a cutting length of 5 to 10 meters, and work at a rate of 10 to 30 strokes per minute. Even with currently available high-quality material in the knife blade, this results in relatively rapid wear of the blade, so that it must be exchanged. Changing conventionally attached blades is a time-consuming procedure however, since a large number of attachment screws must be undone before the worn blade can be removed. It is also necessary to get at the shears from the back, between its end frames. For this purpose, it may be necessary to first of all dismantle the adjustable plate stops and conveyor means provided for handling the cut plates or sheets. Handling the blades, especially the upper blades, also affords certain problems since the relatively heavy objects must be lifted and transported manually within limited space.

SUMMARY OF THE INVENTION

The invention has the purpose of generally providing an arrangement for rapid attachment of elongate prismatic objects in complementarily formed holders and especially an arrangement for rapidly and simply exchanging knife blades in power shears.

This purpose is achieved, in accordance with the invention by an arrangement having the distinguishing features disclosed in the following claims.

BRIEF DESCRIPTION OF DRAWINGS

The invention is described below in the form of an embodiment example while referring to the appended drawings, where:

FIG. 4 is the same section as FIG. 2, but illustrates a further variant form of the attachment arrangement, FIG. 5 is the same section as FIG. 2, but illustrates a still further variant form of the attachment arrangement, FIG. 6 is a fragmentary section similar to the one in FIG. 2, and schematically illustrating another embodiment of the invention.

DESCRIPTION OF PREFERRED EMBODIMENTS

Figure 1:
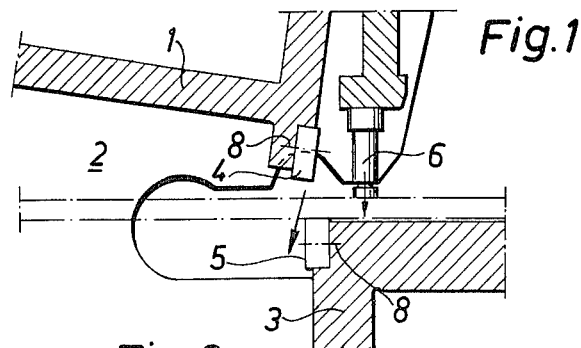
FIG. 1 is a schematic fragmentary section through a power shears, at right angles to the longitudinal direction of the blades, and shows the parts of the shears working closest to the cut.

A power shears is conventionally constructed from two end frames with a support table carrying a lower knife blade adapted therebetween, above which there is a beam guided between the end frames and carrying an upper knife blade for substantially vertical, reciprocating motion relative to the lower blade. In FIG. 1 there will be seen a portion of a side frame 2 and the substantially vertically movable beam 1, with the table 3 therebelow. The beam 1 carries the upper knife blade 4 conventionally attached with the aid of screws 8. The table carries the lower blade 5, similarly attached by means of screws 8. The plate or sheet indicated by chain-dotted lines, rests on the table 3 and blade 5 and is clamped by vertical downward pressure from the clamping means 6. The upper blade 4 moves slightly angularly to the vertical plane in accordance with the arrow on the Figure, to provide the correct cut.

As mentioned above, the blades are conventionally attached to their holders by a broad side of the blade being pressed against a substantially vertical surface on the holder, while a narrow face of the blade abuts against a horizontal surface of the holder. The blade is kept in place with the aid of screws, which press it against the vertical surface. The blade is reversible in the holder, so that all its cutting edges may be utilized, i.e. either of its broad faces and either of its narrow faces can be placed in engagement with the respective surface on the holder. For this purpose, the screw holes in the blade are countersunk on both sides.

Figure 2:
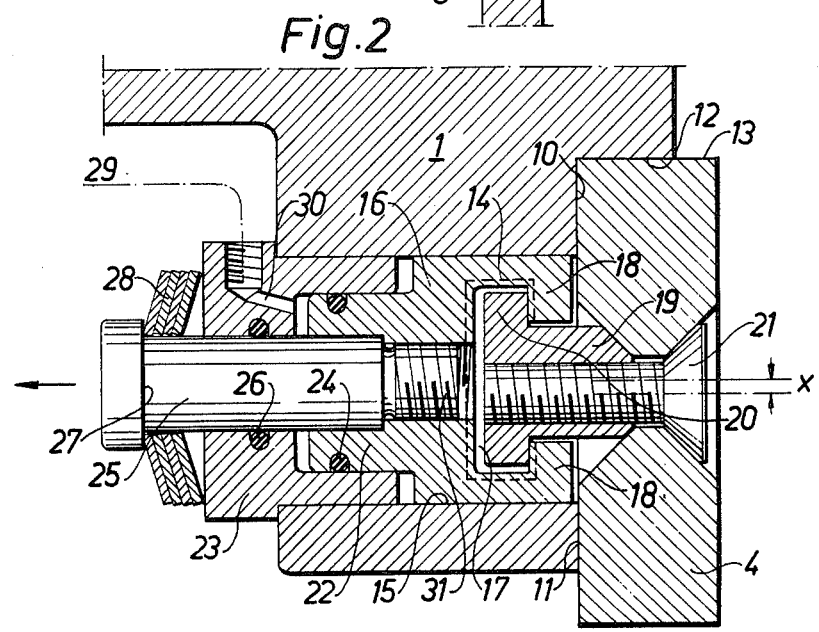
FIG. 2 is a fragmentary section to a larger scale through a portion of the power shears moving cutting beam, and illustrates an attachment arrangement for the blade in accordance with the invention.

To reduce the time required for exchanging a knife blade while also simplifying this exchange, the invention provides an arrangement whereby the blade can be rapidly locked in its working position on the holder, and rapidly released therefrom for pulling out laterally from the shears. Such an arrangement is illustrated in FIG. 2. In this case, the blade is conventionally formed with double screw holes countersunk on both sides. With a first engagement or broad side 11 the blade bears against a first vertical support engagement surface 10 on the holder, in this case the upper moving beam. The second engagement or narrow face 13 of the blade abuts against a second horizontal support engagement surface 12 on the holder. A countersunk screw 21 in each screw hole of the blade engages in a generally cylindrical retainer 19 extending in towards, and past the surface 10 of the beam. The retainer 19 has a retaining shoulder 20. As will be seen from the figure, the retainer bears, via an outward conical surface, against the countersinking of the screw hole facing towards the beam 1. As will be further seen from the figure, the screw 21 engages eccentrically in the retainer 19. This eccentricity of the screw axis in relation to the axis of the retainer is denoted by x. This disposition is adopted so that by adjusting the retainer in different angular positions, its axis may be set at varying spacing from the narrow faces of the blade. The retainer can thus be set at the height relative the holder 1, thereby compensating for the variation of the height of the blade, and thereby the height of the screw hole, which occurs when the second engagement surface or narrow face 13 of the blade is ground. This adjustment is necessary to ensure that the retainer 19 is always disposed at the same height relative to surfaces (described below) on the holder 1.

The holder 1 is provided with a longitudinal groove in the form of a T-slot, the configuration of which is denoted by a dashed line 14. Opposite each screw hole in the blade there is a through-bore 15 in the holder, made from the surface 10 to the opposite side of the holder. Accommodated in this bore 15 there is a gripping member 16 with a T-slot in its surface facing towards the blade. The member 16 is disposed such that its T-slot 17 is aligned with the T-slot 14. The configuration of the slot 17 in the member 16 is such as to form abutments 18 for engaging the shoulder 20 on the retainer 19. In the figure, the cross section of the slot 14 denoted by a dashed line is illustrated somewhat outside the cross-section of the slot in the member 16, but these configurations suitably coincide in practice; the slot 14 being illustrated in this manner solely to clarify the figure. The member 16 is guided for axial movement in the bore 15, and is kept in the desired angular position by an arrangement such as a location pin (not shown) in engagement with an axial groove in said member, so that the configuration of the T-slot in the member 16 may always be in register with the T-slot 14.

At its end remote from the support surface 10, the member 16 is formed as a piston portion 22 engaging in a housing 23 to form a hydraulic pressure cylinder-piston means. The piston 22 is sealed against the cylinder wall by means of an O-ring 24. A piston rod 25 is connected by means of a screwed joint 31 to the piston 22, said piston rod extending out through the housing 23 and provided at its outer end with a shoulder 27. The piston rod is also sealed against the housing by means of an O-ring 26. A pack of Belleville washers 28 is placed between the housing 23 and shoulder 27 to pull the rod 25 out from the housing 23 and member 16 further into the bore 15. Pressure medium such as hydraulic oil can be supplied to the pressure chamber formed between the piston 22 and the interior end wall of the housing 23 via the duct 30 and pipe 29.

The knife blade 4 is normally kept in its working position on the holder 1 by the action of the washers 28, which strive to pull the member 16 further into the bore 15, thereby pressing the blade with required force against the support surface 10 of the holder via the abutments 18 and shoulder 20.

Changing the blade is performed in the following manner.

Hydraulic oil under pressure is supplied to all the cylinder-piston means 23, 22 at the respective attachment points of the blade 4. The piston 22 and member 16 with its abutments 18 are thereby moved towards the support surface 10 against the bias of the washers 28 so that the retainers 19 with shoulders 20 become loose in the members 16. The blade 4 is then loosely held in the T-slots 17 and is at liberty to be moved in the longitudinal direction of the slots 17 and 14. The blade 4 is then moved laterally out of the machine while maintaining the relieving pressure in being in the hydraulic system and with loose guidance in the slot 14, said removal made without difficulty since the configurations of the slots 17 and 14 coincide. To further facilitate the manual removal of the blade, support means can be arranged on one side of the shears, these means including carrying rollers for the blade, for example. The blade thus removed can now be sharpened by grinding the narrow faces thereof. After such grinding, the angular positions of the retainers 19 are adjusted so that the right distance is maintained between the ground-off narrow face of the blade and the axis of the retainer 19. The blade is then ready for re-fitting to the holder in the shears.

The reverse order is applicable for fitting a new blade with correctly adjusted retainers 19. The required hydraulic pressure is supplied to all cylinder-piston means, so that the sleeves 16 are disposed with the slots 17 in register with the slot 14. A new blade is then inserted in the shears from one side, the retainers 19 being loosely guided in the T-slot 14 until they come opposite the respective members 16. It will be noted that this guided insertion of the blade can be done rapidly and simply. When the blade is thus inserted, the hydraulic pressure is released and the washers 28 pull the members 16 into the bores 15 to lock the blade in its working position.

FIG. 2, with its associated description according to the above, refers to the upper blade, but it will be seen that the lower blade can also be attached and released from its holder with the aid of an identical arrangement and in an identical mode.

Figure 3:
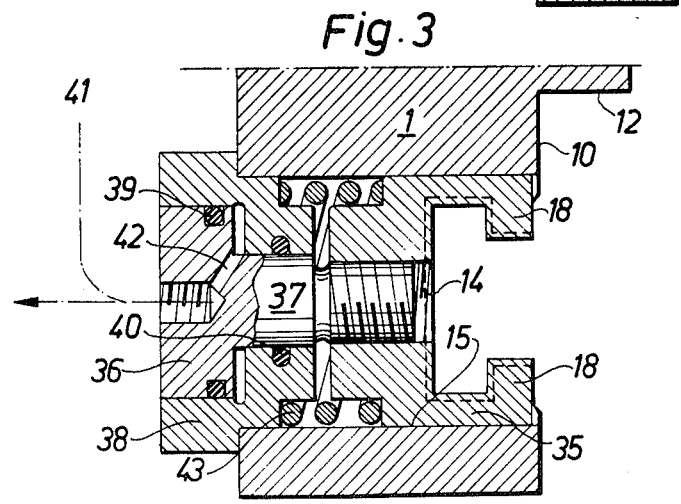
FIG. 3 is the same section as FIG. 2, but illustrates a variant form of the attachment arrangement.

FIG. 3 illustrates a variant of the arrangement described above. The blade and associated retainers are formed exactly the same as already described and are not shown on the figure. In this case the embodiment differs from the one described above in that the gripping member 35 is connected by a screw joint to a piston rod 37, provided with a piston 36 at its end remote from said member. The piston is accommodated in a cylinder housing and is sealed against the cylinder wall by means of an O-ring 39. The piston rod 37, formed as an extension of the piston 36, extends through the cylinder housing and is sealed against it by means of an O-ring 40. The cylinder housing 38 is, similar to the housing 23 described above, attached to the holder in a mode not more closely shown, preferably by a screwed joint. Between the cylinder housing 38 and the member 35 there is inserted a compression spring 43 to urge the member 35 from the cylinder housing towards the right in FIG. 3 for releasing the abutments 18 of the member 35 from a retainer 19. Pressure medium is supplied to the cylinder-piston means 38, 36 via duct 42 in the piston and conduit 41. A certain amount of flexibility in the conduit is assumed here, when the conduit is connected to the movable piston. The conduit can naturally be connected to the pressure chamber of the cylinder in a similar mode as in FIG. 2.

The arrangement functions in the following manner.

It is assumed that a blade is fitted to the holder 1 according to FIG. 2. In this position the hydraulic system is under pressure and the piston 36 with its connected member 35 is urged to the left in the figure, so that the gripping member is drawn into the bore 15. The blade is released by relieving the pressure in the hydraulic system, the spring 42 thereby urging the member 35 to the right in the figure, which releases the abutment 18 from engagement with shoulder 20, so that the blade with associated retainers can be pulled out along the slot 14, as described above. The hydraulic system is unloaded for inserting a new blade, so that the gripping members 35 are disposed with their slots 17 in register with the slot 14. After the blade has been inserted in the slot, with the retainers 19 opposite the respective gripping members, pressure is applied to the cylinder-piston means 36, 38 and the blade is locked in its working position in the holder 1.

A further embodiment of the invention is shown in FIG. 4. In this case a blade 4 having dove-tail grooves or slots 45 on either side is used. The slots have engagement faces 46, and accommodate retainers 47 in the form of truncated cones. The conical faces 48 of the retainers engage the faces 46 of the slots. The retainer 47 is connected to an extension or pulling rod 49, extending through a bore 58 in the holder 1. As in the cases described above, the retainer 47 is eccentrically attached with the aid of a screw 50 to the end of the rod 49 facing towards the blade 4, with an eccentricity x between the axis of the rod and the axis of the screw. This excentric mounting of the retainer 47 serves the same purpose as described above in connection with FIG. 2. The pulling rod carries a piston 51 which is movable in a cylinder housing 52 through which the rod 49 extends. The piston is sealed against the cylinder wall by means of an O-ring 53 and the spindle is sealed against the cylinder housing by means of an O-ring 54. A pack of Belleville washers 28 is mounted on the free end of the rod 49 and bears against the cylinder housing in one direction, and in the other direction against a washer retained at the threaded end of the rod by means of a nut 55. In the working position, the engaging surface 11 of the blade is pressed against the support surface 10 of the holder with the aid of the washers 28, which pull the conical face 48 against the engagement face 46 via the retainer 47 and rod 49. The cylinder housing 52 is attached to the holder 1 in a mode not more closely shown. To release the engagement between the retainer 47 and gripping faces 46 of the slot 45 in the blade, pressure medium is supplied through the conduit 56 and duct 57 to the cylinder chamber in the cylinder-piston means 52, 51.

The arrangement functions in the following way.

It is assumed that a blade is fitted to the holder as shown in FIG. 4. The blade is kept in its working position by the action of the Belleville washers 28, and the pressure medium system is unloaded. Pressure is applied in the system to release the blade, the piston 51 and the rod 49 thus being moved towards the right in the figure against the bias of the springs 28, so that the retainer 47 is taken out of engagement with the slot 45. The blade can now be withdrawn sideways out of the shears while still being guided by the retainers 47 projecting from the holder 1. Retaining the pressure in the hydraulic system, a new blade can be inserted after the retainers 47 have been corrected and checked with gauge-means set according to the blade. To ensure necessary engagement between the engagement surface of the blade and the upper support surface of the holder, the rod 49 is fitted in the bore 58 with a given clearance. To avoid stresses due to misalignment in the system, the mounting of the cylinder housing 52 is arranged to give a certain amount of flexibility.

FIG. 5 illustrates a variant form of the embodiment just described. In this case, a piston 61 in a cylinder housing 62 is connected to the pulling rod 60, with necessary seals 63 and 64 between piston and cylinder and rod and cylinder housing, respectively. A support collar 67 is mounted on the rod, and between this collar and cylinder housing there is a compression spring 66. The piston is attached to the rod 60 with the aid of a nut screwed onto the free rod end. A conduit 68 supplies pressure medium via the duct 69 to the cylinder-piston means 62, 61.

In its working position, a blade according to FIG. 4 is kept pressed against the support surface 10 of the holder 1 by pressure medium being supplied to the pressure cylinder. When the pressure is relieved, the compression spring 66 urges the rod 60 towards the right in the figure and the blade then becomes loose. As previously, exchanging a blade is done by pulling out the blade from one side of the shears. Pressure medium is supplied after inserting a blade, whereby the blade is locked in the working position.

FIG. 6 illustrates a still further embodiment of the invention. In this case a rectangular longitudinal slot is made in the support surface 10 of the holder 1. A bar 76 with a longitudinal groove in the form of a T-slot 81 is mounted for guidance in said slot and is movable in the transverse direction thereof. The T-slot thus has flanges 77 adapted for gripping a retainer of the configuration illustrated in FIG. 2, to retain a blade as shown in FIG. 2. By means of threaded joints 82, the bar is connected to pulling rods 78, extending through bores 80 at right angles to the longitudinal directions of the slots 75 and 81. A plurality adjusted to the stiffness of the bar 76 of such pulling rods 78 are connected to hydraulic cylinders in combination with spring means operating according to any of the methods described above, i.e. by the pulling rods 78 being urged towards the left in the figure, for clamping the blade, either by means of spring bias or hydraulic pressure, and for releasing the blade being moved in the opposite direction by hydraulic pressure or spring bias, respectively.

When the blade is retained in its working position by means of hydraulic pressure, it is suitable for there to be a pressure monitor 90 (FIG. 3) connected into the hydraulic system, this monitor acting on the operating circuit of the shears so that the machine stops if there is an unintentional drop in pressure. A visual or acoustic signal is also suitably coupled to the monitor.

The arrangements described above refer more particularly to retaining the cutting blades of machine shears. It will be seen, however, that these arrangements can to advantage also be used for rapid clamping or releasing elongate objects in holders of varying kinds. It is not always necessary to withdraw the object from the holder entirely in such cases. In using a retaining arrangement, e.g. according to FIG. 4, it is possible to form special recesses in conjunction with the slot which enable the object to be removed after it has been displaced a minor distance.

What I claim is:

1. Means for securing an elongate prismatic object such as the knife blade of a power shears or the like to a holder having first and second elongate engagement surfaces at right angles to one another and engaging respectively first and second engagement surfaces of the object, said holder having a plurality of bores extending in from said first engagement surface at least approximately perpendicular thereto, said bores being spaced from one another longitudinally of said first engagement surfaces, said securing means comprising a plurality of gripping members slidable axially respectively in said bores, means for connecting said gripping members to said object comprising a tongue-and-groove connection with an undercut groove extending longitudinally in one of said first engagement surfaces to permit engagement and disengagement of said tongue-and-groove connection by movement of said object longitudinally relative to said holder, means for moving said gripping members axially in said bores in a direction away from said first engagement surfaces, when said tongue-and-groove connection is engaged, to press said first engagement surface of said object tightly against said first engagement surface of said holder and thereby secure said object to said holder, and means for moving said gripping members axially in said bores in a direction toward said first engagement surfaces to release said object so that said object can be removed from said holder by moving it longitudinally relative to the holder.

2. Securing means according to claim 1, wherein said object is the shearing blade of a power shear and wherein said first engagement surfaces are vertical.

3. Securing means according to claim 1, wherein said means for moving said gripping members in a direction away from said first engagement surfaces comprises spring means acting on each of said members and said means for moving said gripping members in a direction toward said first engagement surfaces comprises hydraulic means acting on all of said gripping members.

4. Securing means according to claim 3, wherein said spring means comprises spring washers.

5. Securing means according to claim 1, wherein said means for moving said gripping memebers in a direction away from said first engagement surfaces comprises hydraulic means acting on all of said gripping members and said means for moving said gripping members in a direction toward said first engagement surfaces comprises spring means acting on each of said gripping members.

6. Securing means according to claim 5, wherein said spring means comprise compression coil springs acting between said holder and said gripping members.

7. Securing means according to claim 5, further comprising means for monitoring the pressure of said hydraulic means.

8. Securing means according to claim 1, in which said tongue-and-groove connection comprises an undercut groove in each of said gripping members and aligned undercut grooves in said first engagement face of said holder and retainers with interfitting tongues secured to said object and engageable with said undercut grooves of respective gripping members to secure said object to said gripping members.

9. Securing means according to claim 8, in which each of said retainers is secured to said object by a countersunk screw extending through a hole in said object and screwing into a tapped hole in said retainer, said tapped hole being eccentric of the retainer whereby the position of said retainer relative to said object can be varied by rotation of said retainer.

10. Securing means according to claim 1, in which said tongue and groove connection comprises a dovetail groove extending longitudinally in said first engagement face of said object and a dove-tail retainer on each of said gripping members interfitting with said dove-tail groove in said object to secure said gripping members to said object.

11. Securing means according to claim 10, in which each of said retainers is secured to the respective gripping member by a countersunk screw extending through an eccentric hole in said retainer and screwed into a tapped hole in the respective gripping member whereby the position of said retainer relative to the gripping member can be varied by rotation of said retainer.

12. Securing means according to claim 10, in which like dove-tail longitudinally extending grooves are provided in opposite faces of said object.

13. Securing means according to claim 1, in which said tongue and groove connection comprises an elongate bar received in a longitudinally extending slot in the said first engagement surface of said holder, means affixing all of said gripping members to said bar, and retainers with interfitting tongues secured to said object and engageable with said undercut groove of said bar to secure said object to said bar.

* * * * *